United States Patent
Shoarinejad

(10) Patent No.: US 8,107,446 B2
(45) Date of Patent: Jan. 31, 2012

(54) WIRELESS RFID NETWORKING SYSTEMS AND METHODS

(75) Inventor: Kambiz Shoarinejad, Los Angeles, CA (US)

(73) Assignee: Radiofy LLC, Los Angeles, CA (US)

( * ) Notice: Subject to any disclaimer, the term of this patent is extended or adjusted under 35 U.S.C. 154(b) by 542 days.

(21) Appl. No.: 11/269,025

(22) Filed: Nov. 7, 2005

(65) Prior Publication Data

US 2007/0103303 A1    May 10, 2007

(51) Int. Cl.
*H04W 4/00* (2009.01)
(52) U.S. Cl. ............ 370/338; 455/404.2; 455/440; 455/456.1
(58) Field of Classification Search .......... 370/338; 455/404.2; 340/572.1–572.9, 10.1–10.6; 235/375–385
See application file for complete search history.

(56) References Cited

U.S. PATENT DOCUMENTS

| | | | |
|---|---|---|---|
| 3,303,501 A | 2/1967 | Mahoney | |
| 3,778,159 A | 12/1973 | Hines et al. | |
| 4,283,726 A | 8/1981 | Spence et al. | |
| 4,851,851 A | 7/1989 | Hane | |
| 5,874,914 A * | 2/1999 | Krasner | 342/357.12 |
| 5,999,124 A | 12/1999 | Sheynblat | |
| 6,131,067 A | 10/2000 | Girerd et al. | |
| 6,185,427 B1 | 2/2001 | Krasner et al. | |
| 6,204,765 B1 | 3/2001 | Brady et al. | |
| 6,215,441 B1 | 4/2001 | Moeglein et al. | |
| 6,295,019 B1 | 9/2001 | Richards et al. | |
| 6,496,806 B1 | 12/2002 | Horwitz et al. | |
| 6,577,238 B1 | 6/2003 | Whitesmith et al. | |
| 6,659,344 B2 | 12/2003 | Otto et al. | |
| 6,717,516 B2 | 4/2004 | Bridgelall | |
| 6,731,908 B2 | 5/2004 | Berliner et al. | |
| 6,750,769 B1 | 6/2004 | Smith | |
| 6,859,761 B2 | 2/2005 | Bensky et al. | |
| 6,868,073 B1 | 3/2005 | Carrender | |
| 6,920,330 B2 | 7/2005 | Caronni et al. | |
| 6,963,289 B2 | 11/2005 | Aljadeff et al. | |

(Continued)

FOREIGN PATENT DOCUMENTS

| WO | WO-2005-091997 A2 | 10/2005 |
|---|---|---|
| WO | WO 2007/056333 | 5/2007 |
| WO | WO 2009/124071 | 10/2009 |

OTHER PUBLICATIONS

Sun Microsystems, "The Sun Global RFID Network Vision: Connecting Businesses at the Edge of the Network", A Technical White Paper, Jul. 2004, pp. 1-20.

(Continued)

*Primary Examiner* — Marcos Batista
(74) *Attorney, Agent, or Firm* — Adeli & Tollen LLP

(57) ABSTRACT

Embodiments of the present invention include a wireless access point that acquires and processes radio frequency identification (RFID) information. The wireless access point may be coupled to a network of RFID readers over a wireless network. The RFID readers may read a plurality of RFID tags and transmit information to one or more readers. The readers may, in turn, transmit the RFID information to a wireless access point. The wireless access point may include a middleware layer for performing a variety of RFID data processing functions. In one embodiment, the wireless RFID reader network may be used to improve positioning of readers and tags, and may include a GPS system or position assisted GPS system at the reader and/or tag level.

13 Claims, 15 Drawing Sheets

U.S. PATENT DOCUMENTS

| | | | |
|---|---|---|---|
| 7,026,935 B2 | 4/2006 | Diorio et al. | |
| 7,038,573 B2 | 5/2006 | Bann | |
| 7,045,996 B2 | 5/2006 | Lyon et al. | |
| 7,057,492 B2 | 6/2006 | Jackson et al. | |
| 7,119,736 B2 | 10/2006 | Heide et al. | |
| 7,119,738 B2 | 10/2006 | Bridgelall et al. | |
| 7,161,470 B2 | 1/2007 | Berquist et al. | |
| 7,205,931 B2 | 4/2007 | Gila et al. | |
| 7,228,228 B2 | 6/2007 | Bartlett et al. | |
| 7,548,153 B2 | 6/2009 | Gravelle et al. | |
| 7,580,378 B2 | 8/2009 | Carrender et al. | |
| 2003/0176196 A1 | 9/2003 | Hall et al. | |
| 2004/0002305 A1 | 1/2004 | Byman-Kivivuori et al. | |
| 2004/0185873 A1 | 9/2004 | Gilkes et al. | |
| 2004/0243588 A1* | 12/2004 | Tanner et al. | 707/100 |
| 2004/0260506 A1 | 12/2004 | Jones et al. | |
| 2005/0030160 A1 | 2/2005 | Goren et al. | |
| 2005/0036460 A1* | 2/2005 | Dougherty et al. | 370/328 |
| 2005/0088284 A1 | 4/2005 | Zai et al. | |
| 2005/0129139 A1 | 6/2005 | Jones et al. | |
| 2005/0198228 A1 | 9/2005 | Bajwa et al. | |
| 2005/0237953 A1 | 10/2005 | Carrender et al. | |
| 2005/0242188 A1 | 11/2005 | Vesuna | |
| 2005/0245235 A1* | 11/2005 | Vesuna | 455/411 |
| 2006/0012465 A1* | 1/2006 | Lee et al. | 340/10.2 |
| 2006/0068750 A1 | 3/2006 | Burr | |
| 2006/0114104 A1* | 6/2006 | Scaramozzino | 340/10.2 |
| 2006/0170565 A1* | 8/2006 | Husak et al. | 340/825.49 |
| 2006/0170591 A1 | 8/2006 | Houri | |
| 2006/0197652 A1* | 9/2006 | Hild et al. | 340/10.2 |
| 2006/0217131 A1 | 9/2006 | Alizadeh-Shabdiz et al. | |
| 2006/0267731 A1* | 11/2006 | Chen | 340/10.1 |
| 2007/0045424 A1* | 3/2007 | Wang | 235/462.46 |
| 2007/0046467 A1* | 3/2007 | Chakraborty et al. | 340/572.1 |
| 2007/0075838 A1* | 4/2007 | Powell | 340/10.2 |
| 2007/0096876 A1* | 5/2007 | Bridgelall et al. | 340/10.1 |
| 2007/0099627 A1 | 5/2007 | Kofol et al. | |
| 2007/0216540 A1 | 9/2007 | Riley et al. | |
| 2007/0252758 A1 | 11/2007 | Loomis | |
| 2008/0008109 A1* | 1/2008 | Ollis | 370/310 |
| 2008/0045236 A1 | 2/2008 | Nahon et al. | |
| 2008/0088452 A1* | 4/2008 | Agrawal et al. | 340/572.1 |
| 2008/0143482 A1 | 6/2008 | Shoarinejad et al. | |
| 2008/0143584 A1 | 6/2008 | Shoarinejad et al. | |
| 2008/0278328 A1* | 11/2008 | Chand et al. | 340/572.1 |
| 2008/0284646 A1 | 11/2008 | Walley et al. | |
| 2008/0318579 A1 | 12/2008 | McCoy et al. | |
| 2009/0033462 A1 | 2/2009 | Kitayoshi et al. | |

OTHER PUBLICATIONS

Auto-ID Center, Auto-ID Savant Specification 1.0, 2003, pp. 1-58.

Cisco Systems, "Delivering An Intelligent Foundation for RFID: Maximizing Network Efficiency With Cisco RFID Solutions", 2005, pp. 1-6.

Cisco Systems, Cisco Application-Oriented Networking Facilitates Intelligent Radio Frequency Identification Processing at the Edge, 2005, pp. 1-9.

Connecterra, "Four Challenges", 2004, pp. 1-7.

Connecterra, "Establishing the Foundation for Enterprise-Scale RFID Deployments", www.connecterra.com/products/rftagaware,php, Sep. 2005, pp. 1-2.

Connecterra, "ConnecTerra Product Family", www.connecterra.com, 2005, pp. 1-2.

Connecterra, "RFTag Aware™ Enterprise Server, Centralized EPC Data Management and Reporting for Enterprise-Scale RFID Deployments", www.connecterra.com, 2005, pp. 1-2.

IAUTOMATE.COM, "Installation Manual R500HA Long Range RFID Reader", www.iautomate.com, 2005, pp. 1-40.

Reynolds and Weigand, "Design Considerations for embedded software-defined RFID Readers", Emerging Wireless Technology/ A Supplement to RF Design, Aug. 2005, pp. 14-15.

Miller, "Why UWB? A Review of Ultrawideband Technology", National Institute of Standards and Technology, DARPA, Apr. 2003, pp. 1-72, Gaithersburg, Maryland.

Miller, "Wireless Technologies and the SAFECOM SoR for Public Safety Communications", National Institute of Standards and Technology, 2005, pp. 1-68, Gaithersburg, Maryland.

Chon et al., "Using RFID for Accurate Positioning", Journal of Global Positioning Systems, vol. 3, No. 1-2: pp. 32-39, Feb. 3, 2005.

Okabe, "A Car Navigation System Utilizing a GPS Receiver", 1993 IEEE, Mar. 1993, pp. 278-279.

Philipose et al., "Mapping and Localization with RFID Technology", Intel Research White Paper, Dec. 2003.

Kulyukin et al., "RFID in Robot-Assisted Indoor Navigation for the Visually Impaired", Research Paper, Utah State University, Feb 2004.

Trolley Scan, "Issues on range and accuracy of RFID-radar™ system", RFID-radar accuracy report, pp. 1-4, Feb. 2006.

Patwari et al., "Locating the Nodes", IEEE Signal Processing Magazine, pp. 54-69, Jul. 2005.

Gustafsson et al., "Mobile Positioning Using Wireless Networks", IEEE Signal Processing Magazine, pp. 41-53, Jul. 2005.

Sun et al., "Signal Processing Techniques in Network-Aided Positioning", IEEE Signal Processing Magazine, pp. 12-23, Jul. 2005.

Sayed et al., "Network-Based Wireless Location", IEEE Signal Processing Magazine, pp. 24-40, Jul. 2005.

International Search Report and Written Opinion for PCT/US2006/043273, Jul. 17, 2007 (mailing date), Radiofy LLC.

International Preliminary Report on Patentability for PCT/US2006/043273, May 7, 2008 (Issuance date), Radiofy LLC.

Updated portions of prosecution history of U.S. Appl. No. 11/641,624, Sep. 12, 2011, Shoarinejad, Kambiz, et al.

Portions of prosecution history of U.S. Appl. No. 11/641,623, Sep. 16, 2010, Shoarinejad, Kambiz, et al.

Portions of prosecution history of U.S. Appl. No. 11/641,624, Jun. 10, 2011, Shoarinejad, Kambiz, et al.

International Search Report and Written Opinion for PCT/US2009/038992, May 20, 2009 (mailing date), Moshfeghi, Mehran.

International Preliminary Report on Patentability for PCT/US2009/038992, Oct. 5, 2010 (issuance date), Moshfeghi, Mehran.

Author Unknown, "OFDM for Mobile Data Communications," International Engineering Consortium, Month Unknown, 2007, pp. 1-24.

Bahl, Paramvir, et al., "RADAR: An In-Building RF-Based User Location and Tracking System," in Proceedings of IEEE Infocom, Mar. 2000, pp. 775-784, vol. 2.

Chun, Sebum, et al., "Performance Analysis of GPS Integer Ambiguity Resolution Using External Aiding Information," Journal of Global Positioning Systems, Month Unknown, 2005, vol. 4, No. 1-2, pp. 201-206.

Donghyun, Kim, et al., "GPS Ambiguity Resolution and Validation: Methodologies, Trends, and Issues," 7th GNSS Workshop—International Symposium on GPS/GNSS, Nov. 30-Dec. 2, 2000, Seoul, Korea.

Muthukrishnan, Kavitha, et al., "Towards Smart Surroundings: Enabling Techniques and Technologies for Localization," in: 1st Int. Workshop on Location- and Context-Awareness (LoCA), May 2005, pp. 350-362, University of Twente, the Netherlands.

Harter, Andy, et al., "A Distributed Location System for the Active Office," IEEE Network, Jan. 1994, vol. 8, No. 1.

Lamarca, Anthony, et al., "Place Lab: Device Positioning Using Radio Beacons in the Wild," In Pervasive Computing, Month Unknown, 2005, pp. 116-133.

Maes, Pattie, et al., "Unveiling the Sixth Sense, Game Changing Wearable Tech," TED, Feb. 2009, Long Beach, CA USA. http://www.ted.com/index.php/talks/pattie_maes_demos_the_sixth_sense.html the source video / home page (Al, A2) for the Video Clip.

Muthukrishnan, Kavitha, et al., "Towards Smart Surroundings: Enabling Techniques and Technologies for Localization," In: 1st Int. Workshop on Location- and Context-Awareness (LoCA), May, 2005, pp. 350-362, University of Twente, the Netherlands.

Turin, George L., et al., "Simulation of Urban Vehicle-Monitoring Systems," IEEE Transactions on Vehicular Technology, Feb. 1972, pp. 9-16, vol. VT-21, No. 1.

Want, Roy, et al., "The Active Badge Location System," ACM Trans. Inf. Syst., 10(1): pp. 91-102, Month Unknown, 1992.

\* cited by examiner

2

WIRELESS RFID NETWORKING SYSTEMS AND METHODS

BACKGROUND

The present invention relates to radio frequency identification ("RFID"), and in particular, to wireless RFID networking systems and methods.

RFID systems are useful in a wide variety of applications. RFID systems are radio communication systems that include small low cost electronic devices that store information including identification ("ID") information, for example. These devices are referred to as RFID tags. The RFID tags may be designed using backscattering circuit techniques, for example, so that another device can retrieve the ID wirelessly. The retrieving device is typically referred to as a "reader," and sometimes "an interrogator." The tags are typically very small, and may be placed on a variety of items including equipment, products, or even people, for example, and identification of such items may be made through a reader. Accordingly, RFID systems may be used to track inventory in a warehouse, the number of products on store shelves, or the location of equipment in a company, to name just a few example applications.

RFID systems may include large numbers of tags and readers spread out across potentially wide areas. The large number of tags and readers may result in a correspondingly large volume of information that may need to be processed. Such information may include large volumes of tag IDs. In order to process such information, powerful readers are typically used that include complex software capable of interfacing with backend systems that store and ultimately use the data.

FIG. 1 is an example of a prior art RFID system. Information from numerous RFID tags 101A-C is received wirelessly by RFID readers 102A-C. Each RFID reader includes an RFID client software component 103A-C (e.g., a Savant Client) that is designed to operate with an RFID central server software component 110 (e.g., a Savant Server) over a network 111. The central server 110 uses a client-server architecture for moving data between the readers and the server. Since all the RFID specific operations are included in two components, the readers are typically powerful systems that can work with the server to manage the data retrieved from the RFID tags. The RFID central server, in turn, is coupled to a backend data storage and processing system 120 over network 150. Backend system 120 may be coupled to a database 130 for storing the RFID data, for example.

It is generally desirable to reduce the cost of the tags and the readers that access them. Additionally, it is desirable to improve the management of the RFID tags and the features and flexibility of the RFID system. Existing RFID systems are expensive because, as mentioned above, readers require powerful processors to execute the client software required to interface with the server to make the system operational. It would be beneficial if a new architecture were developed to lower the overall RFID system cost and improve the features and flexibility of the RFID system.

Thus, there is a need to improve RFID systems. Accordingly, the present invention provides improved wireless RFID networking systems and methods.

SUMMARY

Embodiments of the present invention include a wireless access point that acquires and processes radio frequency identification (RFID) information. The wireless access point may be coupled to a network of RFID readers over a wireless network. The RFID readers may read a plurality of RFID tags and transmit information to one or more readers. The readers may, in turn, transmit the RFID information to a wireless access point. The wireless access point may include a middleware layer for performing a variety of RFID data processing functions. In one embodiment, the wireless RFID reader network may be used to improve positioning of readers and tags, and may include a GPS system or position assisted GPS system at the reader and/or tag level.

According to one embodiment of the present invention, a wireless access point includes a first physical layer interface, a second physical layer interface, and middleware software. The first physical layer interfaces the wireless access point to a wireless link and communicates first RFID data to the wireless access point from a plurality of RFID readers. The RFID readers read a plurality of RFID tags. The first RFID data results from reading the RFID tags. The second physical layer interfaces the wireless access point to a wired or wireless link and communicates second RFID data from the wireless access point to a server. The middleware controls the wireless access point to receive and store tag information from the RFID tags. In this manner, the wireless access point offloads processing from the server.

According to another embodiment of the present invention, the middleware controls the wireless access point to process the tag information prior to transmission to the server.

According to yet another embodiment of the present invention, the middleware controls the wireless access point to estimate a position of a RFID tag.

According to still another embodiment of the present invention, the middleware controls the wireless access point to pre-process global positioning system (GPS) information for an RFID reader.

These and other features of the present invention are detailed in the following drawings and related description.

DETAILED DESCRIPTION

Described herein are techniques for networking RFID system components. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
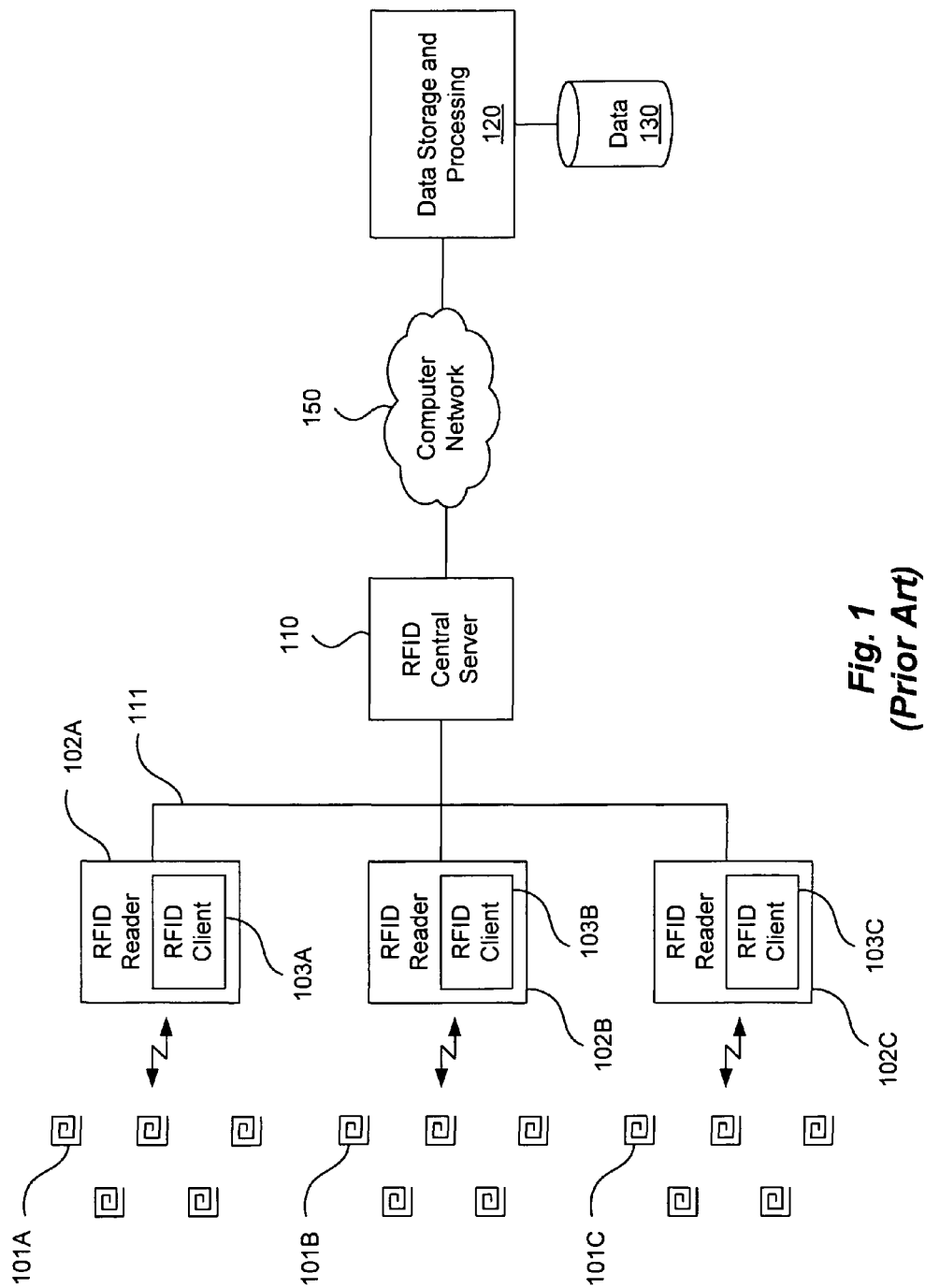
FIG. 1 is an example of a prior art RFID system.
Figure 2:
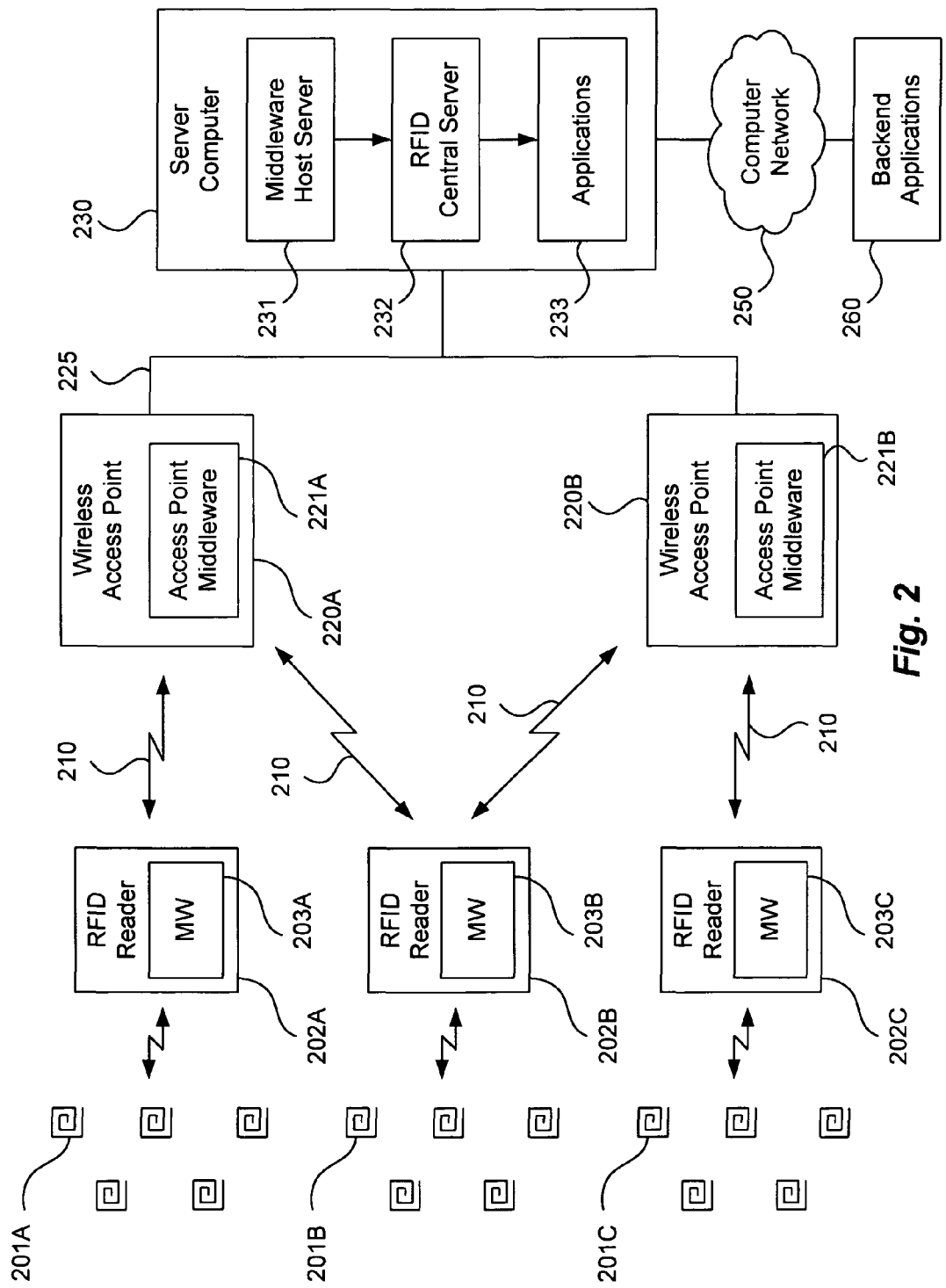
FIG. 2 illustrates an RFID network according to one embodiment of the present invention.

FIG. 2 illustrates an RFID network according to one embodiment of the present invention. A plurality of RFID tags 201A-C may receive signals from RFID readers 202A-C. The tags may be active or passive backscattering circuits (i.e., with or without an internal source of energy such as a battery), for example, or in some embodiments a more complex sensor network capable of wireless automatic identification. In response to the received signals, the RFID tags will transmit information back to the readers. Readers 202A may include a variety of devices such as application specific readers, personal digital assistants, cell phones, or other handheld devices. RFID readers 202A-C are coupled together over a wireless network link 210 (i.e., a communication channel). The wireless network link may be an 802.11 wireless network link, a Bluetooth network link, a Zigbee network link, cellular network link, backscattering link, or other wireless network link using radio frequency signals, for example. Thus, RFID reader 202A may communicate with wireless access point 220A over a wireless network 210. Similarly, RFID reader 202C may communicate with wireless access point 220B over a similar wireless network 210. Accordingly, the readers and wireless access points include physical layer circuits and systems for implementing the wireless transmissions, such as RF transceivers and baseband processors, for example. In some cases, an RFID reader may be within range of multiple access points. In this example, RFID reader 202B is within range of both access points 220A and 220B. Accordingly, information from RFID reader 202B may communicate wirelessly with both of access points 220A and/or 220B. In this example, wireless access points 220A and 220B are coupled to a server computer 230 over a wired (e.g., Ethernet or RS-485) or wireless network 225. However, in some applications the wireless access points may be coupled to a central server over a wireless network (in which case the central server may act as a central access point). The server computer 230 may, in turn, be coupled to backend applications and databases 260 over another network 250, such as the Internet or an intranet, for example.

In one embodiment, an application layer is added to wireless access points 220A-B. The application layer includes an access point middleware software component 221 that works with a middleware ("MW") reader software component 203 to manage the network of RFID readers and related tags. In one embodiment, access point middleware 221A-B may be used for tag or reader registration, tag or reader positioning, or network and data management. Access point middleware 221A-B may be used to hide the network of RFID readers behind the access point thereby making the network more flexible and reducing the processing burden on the server 230. For example, in one embodiment, server computer 230 includes a middleware host 231 that is part of a distributed middleware system for simplifying management of the reader network. Server computer 230 may further include an RFID central server 232 that communicates with wireless access points 220 and applications 233 for managing and processing data associated with the RFIDs. Additionally, Access point software 221A-B may be used to offload network management and data processing from the reader, which lowers the cost of the reader, and accordingly, the entire RFID network.

Figure 3:
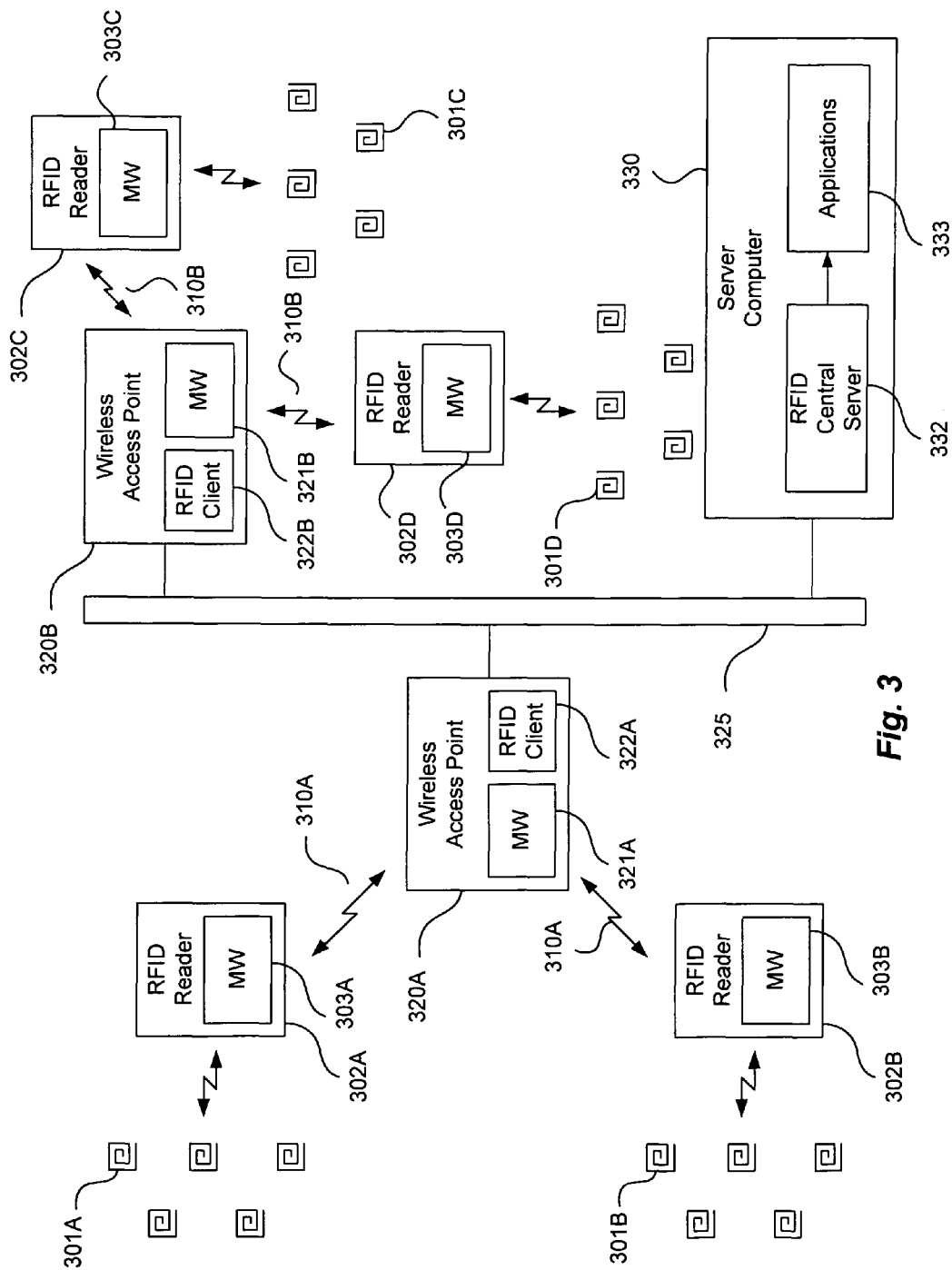
FIG. 3 illustrates an RFID network according to another embodiment of the present invention.

FIG. 3 illustrates an RFID network according to another embodiment of the present invention. A plurality of RFID tags 301A-D may receive signals from RFID readers 302A-D. In response to the received signals, the RFID tags will transmit information back to the readers. RFID readers 302A-B are configured in a wireless network and communicate with wireless access point 320A over a wireless communication channel 310A, and RFID readers 302C-D are configured in a wireless network and communicate with wireless access point 320B over a wireless communication channel 310B. Wireless access points 320A and 320B are coupled to a server computer 330 over a wired or wireless network 325. RFID readers 302A-D include a middleware ("MW") software component 303A-D, and the wireless access points 320A-B include a middleware application layer component 321A-B. In this example, the access points 320A-B further include RFID client software components 322A-B. Embodiments of the present invention may move software functions from the reader to software executed on an application layer on the access point. The RFID clients 322A-B perform transactions with an RFID central server software component 332 on server computer 330. Accordingly, the software architecture in this example distributes RFID network processing across the entire network to reduce the processing burden on the reader and thereby reduce the overall cost of the network.

Figure 4A:
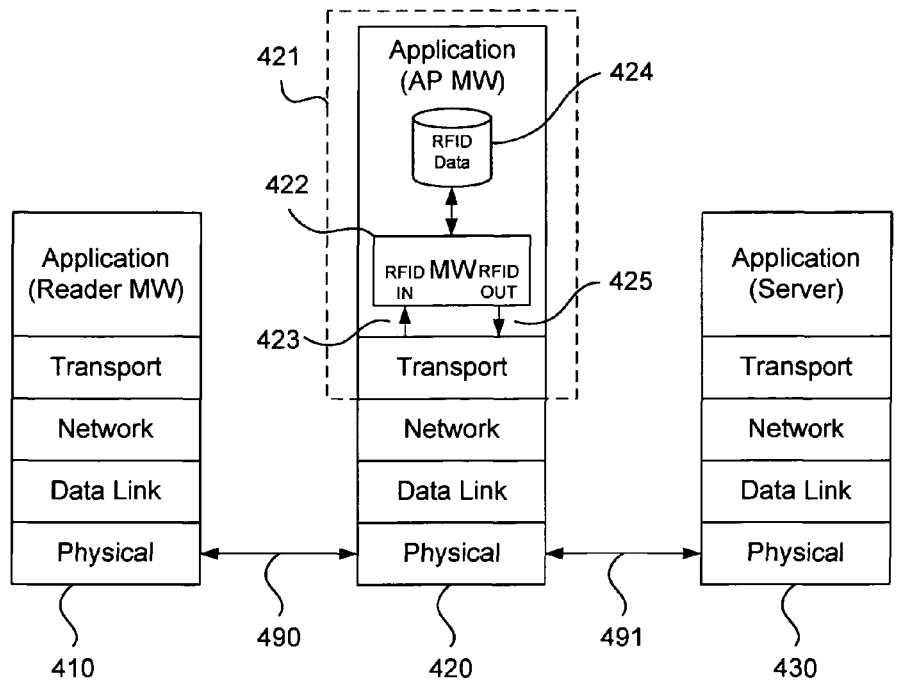
FIGS. 4A-F illustrate examples of RFID middleware on a wireless access point according to other embodiments of the present invention.

FIG. 4A illustrates an example of a network model for an RFID network according to another embodiment of the present invention. This example shows the network model for a reader 410, access point 420, and server computer 430. The reader 410 and the access point 420 communicate over a wireless network link 490. The access point 420 and the server computer 420 communicate over a wired or wireless network link 491. The wired or wireless network link 491 may be, for example, a local area network connection such as Ethernet, an intranet, or a wide area network such as the Internet, or any of the wireless networks described above.

The network model for reader 410 includes a physical layer, data link layer, network layer, transport layer, and application layer. The application layer may include a reader middleware software component ("Reader MW") as described above. The physical layer in this case is a wireless network link including a wireless receiver and transmitter coupled to an antenna.

Access point 420 includes a physical layer, data link layer, and network layer. In one embodiment of the present invention, an access point 420 is provided that further includes a transport layer and application layer 421 for running access point middleware software 422 ("AP MW") described above for preprocessing the RFID data. The physical layer may include a wireless receiver and transmitter coupled to an antenna for communicating with one or more readers. The physical layer may also support wired or wireless communication with another computer 430 (e.g., Ethernet).

The AP MW 422 coordinates the input of RFID information 423 received from the reader 410, the storage of the RFID data in a storage unit 424, and the output of RFID information 425 to be sent to the server computer 430. Such coordination includes functions such as monitoring and management of the reader 410 (referred to as device management), connectivity management of the connection between the access point 420 and the server 430, connectivity management of the connection between the readers 410 and access point 420, fault detection of failures or other problems with the reader 410, maintenance and upgrades for the reader 410, and data management (processing) of RFID information. Such data processing may include data aggregation, data smoothing, data filtering, redundancy processing, multiprotocol format negotiation (for example, configuring the reader 410 to communicate with the RFID tags using different protocols, or responding to a request by the server 430 to read all tags having a certain set of protocols). The access point 420 may include a processor, controller, micro-controller, programmable logic device, or other integrated circuit device that executes the AP MW 422. The storage unit 424 may be a memory, hard disk, or other type of storage system.

Server computer 430 includes a physical layer, data link layer, network layer, transport layer, and application layer. The application layer on the server may include a central RFID server and other software for receiving and processing RFID applications.

Figure 4B:
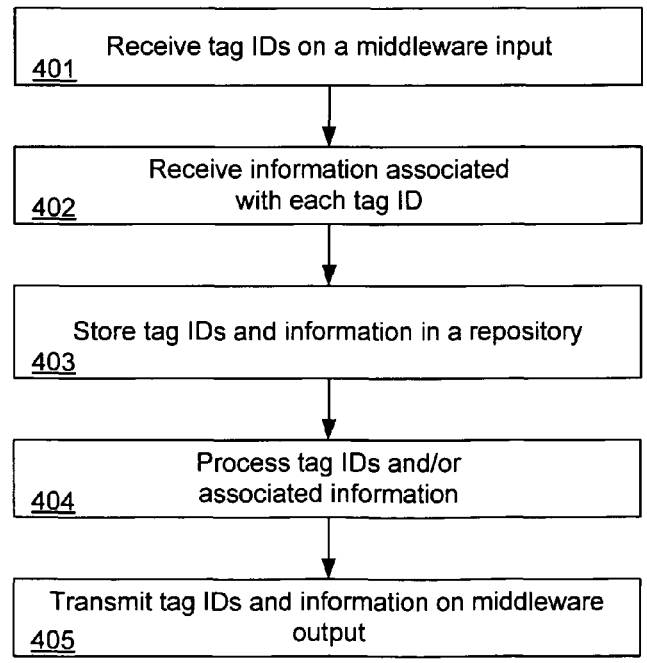

FIG. 4B illustrates a method according to another embodiment of the present invention. At 401, tag IDs are received in an application layer of a wireless access point on an input 423 of middleware 422. At 402, information associated with the tag IDs (e.g., position information) may also be received in middleware 422. At 403, the tag IDs are stored in a repository, such as a database or other data storage facility, for example. At 404, the tag IDs and/or the associated information are processed by the middleware. As mentioned above, processing may include data or device monitoring or management, for example. At 405, the tag IDs and/or the associated information are transmitted on middleware output 425 over a wired or wireless link 491 to a server 430 for further processing if desired.

Figure 4C:
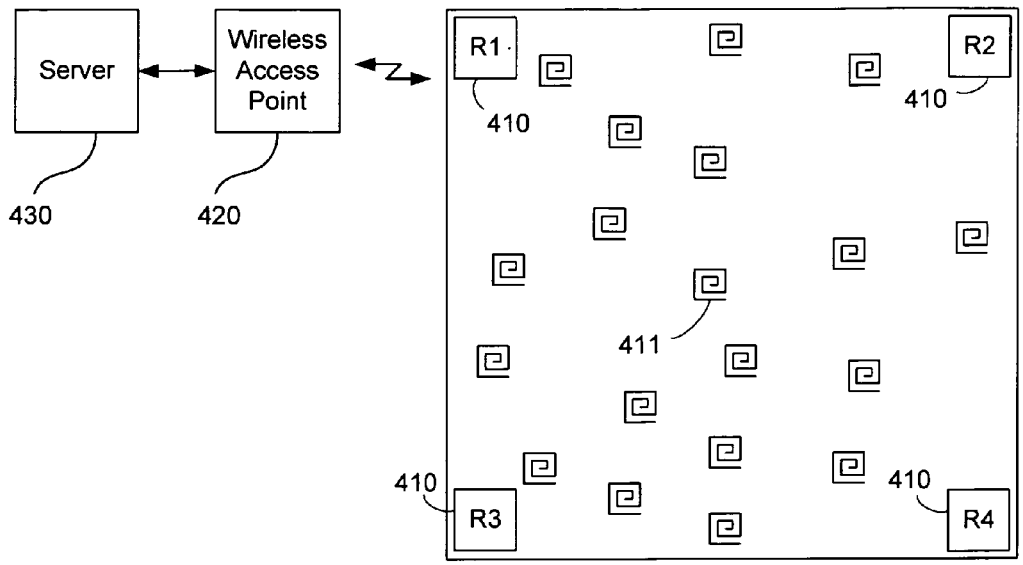

FIG. 4C illustrates an RFID network according to another embodiment of the present invention. A plurality of RFID tags 411 are located within a location (such as a building or warehouse) that is covered by a plurality of RFID readers 410 (labeled R1, R2, R3 and R4). The RFID tags 411 may receive signals from the RFID readers 410. In response to the received signals, the RFID tags 411 will transmit information back to the readers 410. The RFID readers 410 are configured in a wireless network and communicate with a wireless access point 420 over a wireless communication channel. The wireless access point 420 is coupled to a server computer 430 over a wired or wireless network. The access point 420 includes a MW software component (see above regarding FIG. 4A) that in this case may be configured to offload redundancy processing from the server 430, as discussed below with reference to FIG. 4D.

Figure 4D:
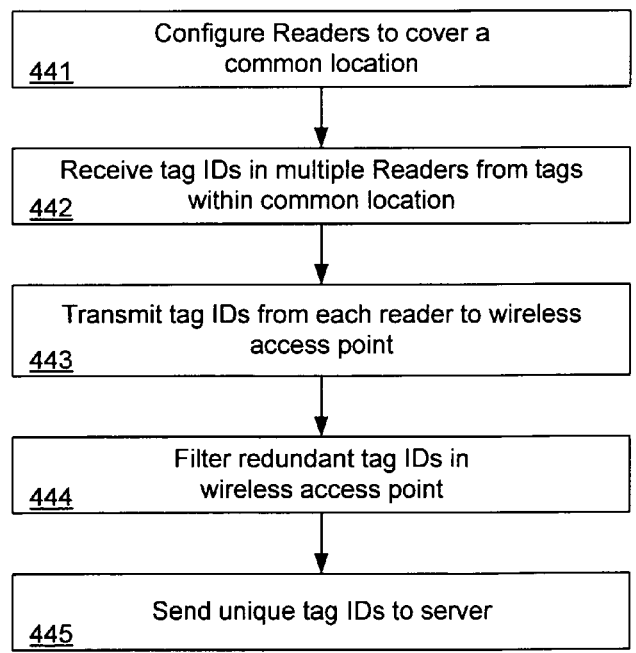

FIG. 4D illustrates redundancy offload processing according to another embodiment of the present invention. At 441, the wireless access point 420 configures the readers 410 to cover a common location. Such configuration may include sequencing the readers 410 for reading operations (of the tags 411) or data transmission operations (to the access point 420) to manage the likelihood of interference. For example, the access point 420 may configure the reader R1 to read tags during a first time segment, the reader R2 to read tags during a second time segment, etc. As another example, the access point 420 may configure the reader R1 to transmit its information to the access point 420 during a first time segment, the reader R2 to transmit its information during a second time segment, etc. Alternatively, the access point 420 may configure the readers 410 to communicate with tags and/or the access point 420 at different frequencies. In yet other embodiments, communication between wireless access point 420, readers 410, and tags may be at different time slots and different frequencies. Readers 410 may also use beamforming techniques and directional antennas to communicate with tags, for example, so different beams and/or different polarizations may also be used.

With reference to FIG. 4C, a particular RFID tag 411 may be in range of more than one of the readers 410. Including more than one reader 410 allows for redundancy to improve reliability of the RFID system. For example, a particular RFID tag 411 may be blocked by shelving, etc. from receiving signals from the readers R1, R2 and R3, but may be situated such that it receives signals from the reader R4. As another example, if the reader R1 fails, the other readers R2, R3 and R4 are still operational, allowing the RFID system to continue to function.

At 442, according to the particulars of the configuration (see 441 above), the readers 410 receive the tag IDs from the tags 411 in the common area. At 443, according to the particulars of the configuration (see 441 above), the readers 410 transmit the tag IDs from each reader to the wireless access point 420. The access point 420 may store the tag IDs in the repository 424 (see FIG. 4A) along with an identifier that identifies which of the readers 410 read that tag. As multiple ones of the readers 410 may read the same tag 411, the storage unit 424 may contain redundant tag data.

At 444, the access point 420 filters the redundant tag information. At 445, the access point 420 sends the unique tag IDs to the server 430. In this manner, the access point 420 offloads redundancy processing from the server 430. The server 430 need not be aware of the specifics of the configuration of the readers 410.

Figure 4E:
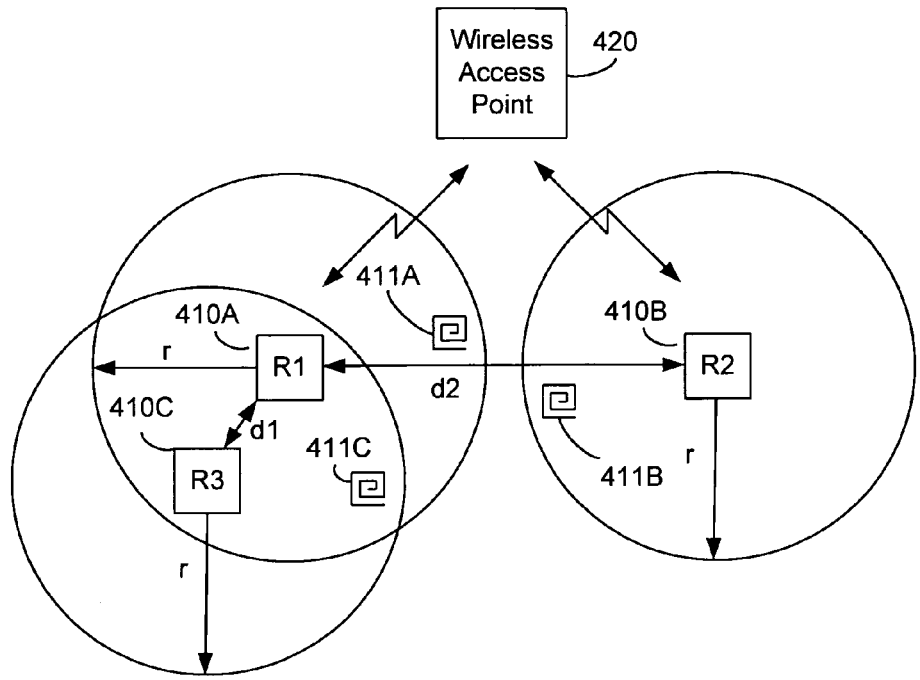

FIG. 4E illustrates an RFID network according to another embodiment of the present invention. A plurality of RFID readers 410A, 410B and 410C and a plurality of RFID tags 411A, 411B and 411C are located in an area. The readers 410A, 410B and 410C communicate with a wireless access point 420 over a wireless communication channel. The readers 410A, 410B and 410C have a range represented by "r" in the figure. Thus, tag 411B is within range of reader 410B, tag 411A is within range of reader 410A, and tag 411C is within range of both reader 410A and reader 410C. The readers 410A, 410B and 410C are separated by a distance, represented in the figure by "d1" as the distance between the readers 410A and 410C, and by "d2" as the distance between the readers 410A and 410B. The access point 420 includes a MW software component (see above regarding FIG. 4A) that in this case may be configured to offload read request processing from the server 430, as discussed below with reference to FIG. 4F.

Figure 4F:
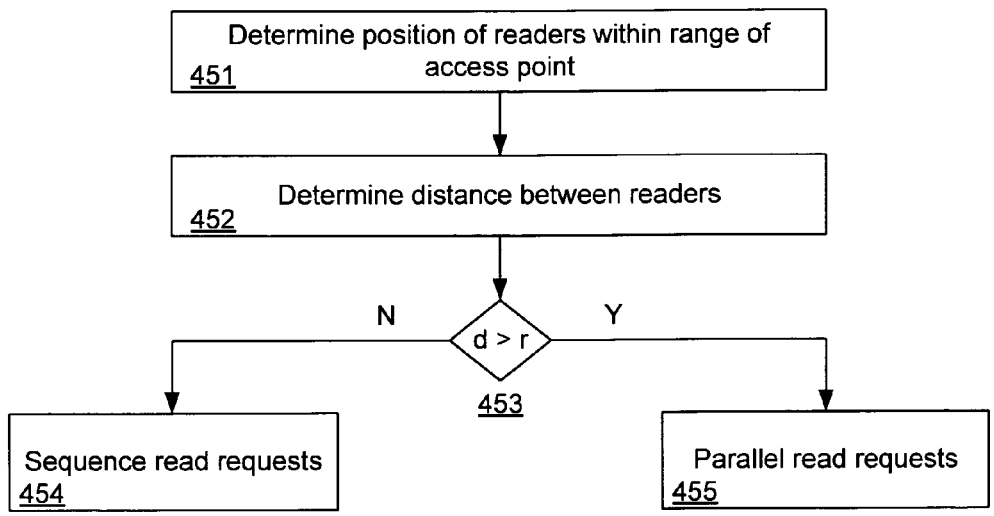

FIG. 4F illustrates read request offload processing according to another embodiment of the present invention. At 451, the access point 420 determines the position of the readers within range of the access point. With reference to FIG. 4E as an example, the readers 410A, 410B and 410C are within range of the access point 420. The access point may use a variety of techniques for determining the position of the readers, as discussed below.

At 452, the access point 420 determines the distance(s) between the readers. The access point 420 may determine the distances based on the position information (see 451 above).

With reference to FIG. 4E as an example, the distance between the readers 410A and 410C is d1, and the distance between the readers 410A and 410B is d2. According to one embodiment, the distance between a particular reader and the next-closest reader is relevant for the process of FIG. 4E, so the distance between the readers 410B and 410C is not relevant for the process.

At 453, the access point 420 determines whether the distance between readers (referred to as "d") is greater than the range of the readers (referred to as "r"). If not, the access point 420 proceeds to 454; if so, the access point proceeds to 455. With reference to FIG. 4E as an example, the distance d1 between the readers 410A and 410C is not greater than the range r (so proceed to 454); the distance d2 between the readers 410A and 410B is greater than the range r (so proceed to 455).

At 454, the access point 420 instructs the readers identified in 453 to sequence their read requests of the tags. In the case where d is not greater than r, a particular tag may be within range of more than one reader. In such a case, by the access point 420 instructing the readers to perform read requests sequentially, a particular tag does not receive more than one read request at the same time. With reference to FIG. 4E as an example, the access point 420 instructs the readers 410A and 410C to perform their read requests sequentially. When the reader 410A performs its read request, it reads tags 411A and 411C. When the reader 410C performs its read request, it reads tag 411C. Sequenced read requests avoid the tag 411C being read simultaneously.

At 455, the access point 420 instructs the readers identified in 453 to read tags in parallel. In the case where d is greater than r, there is no risk that a particular tag may be within range of more than one reader. Thus, the access point 420 may instruct the readers to perform their read requests in parallel without a particular tag receiving more than one read request at the same time. With reference to FIG. 4E as an example, the access point 420 instructs the reader 410B to perform its read requests in parallel with either the reader 410A or the reader 410C.

Performing read requests in parallel increases the throughput of reading tags. Namely, if one reader can read N tags within a time period, M readers in parallel can read a number of tags equal to M*N in the same time period. In the manner described above, the access point 420 offloads read request configuration processing from the server 430 (see FIG. 4A). The server 430 need not be aware of the specifics of the configuration of the readers 410A, 410B and 410C.

Figure 5:
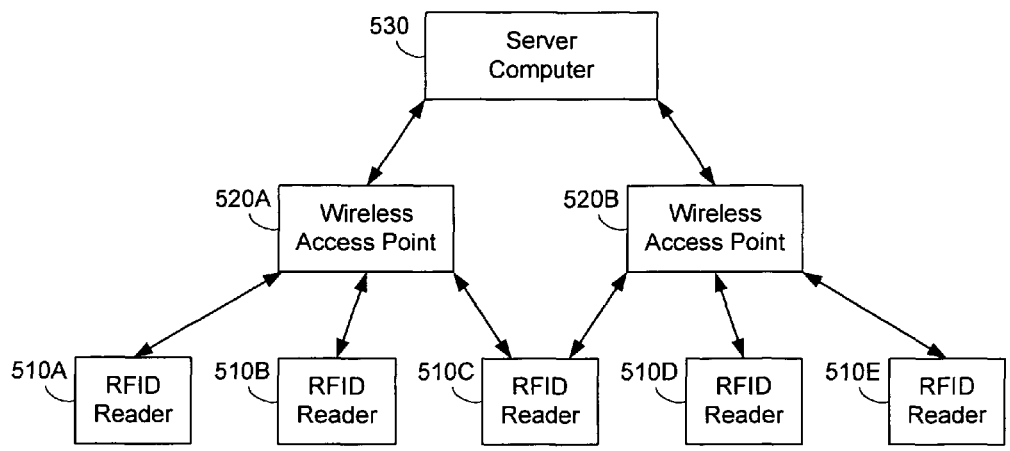
FIG. 5 illustrates a network configuration according to one embodiment of the present invention.
Figure 6:
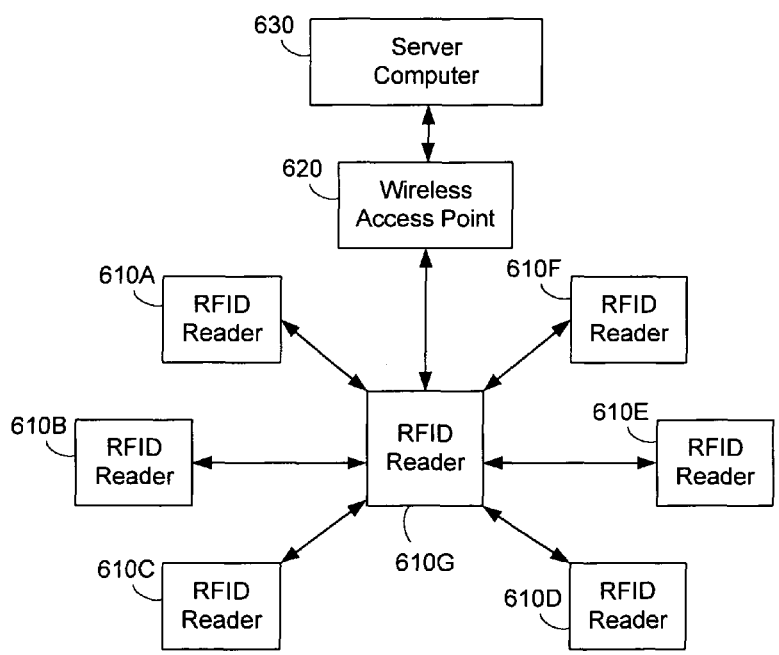
FIG. 6 illustrates a network configuration according to another embodiment of the present invention.
Figure 7:
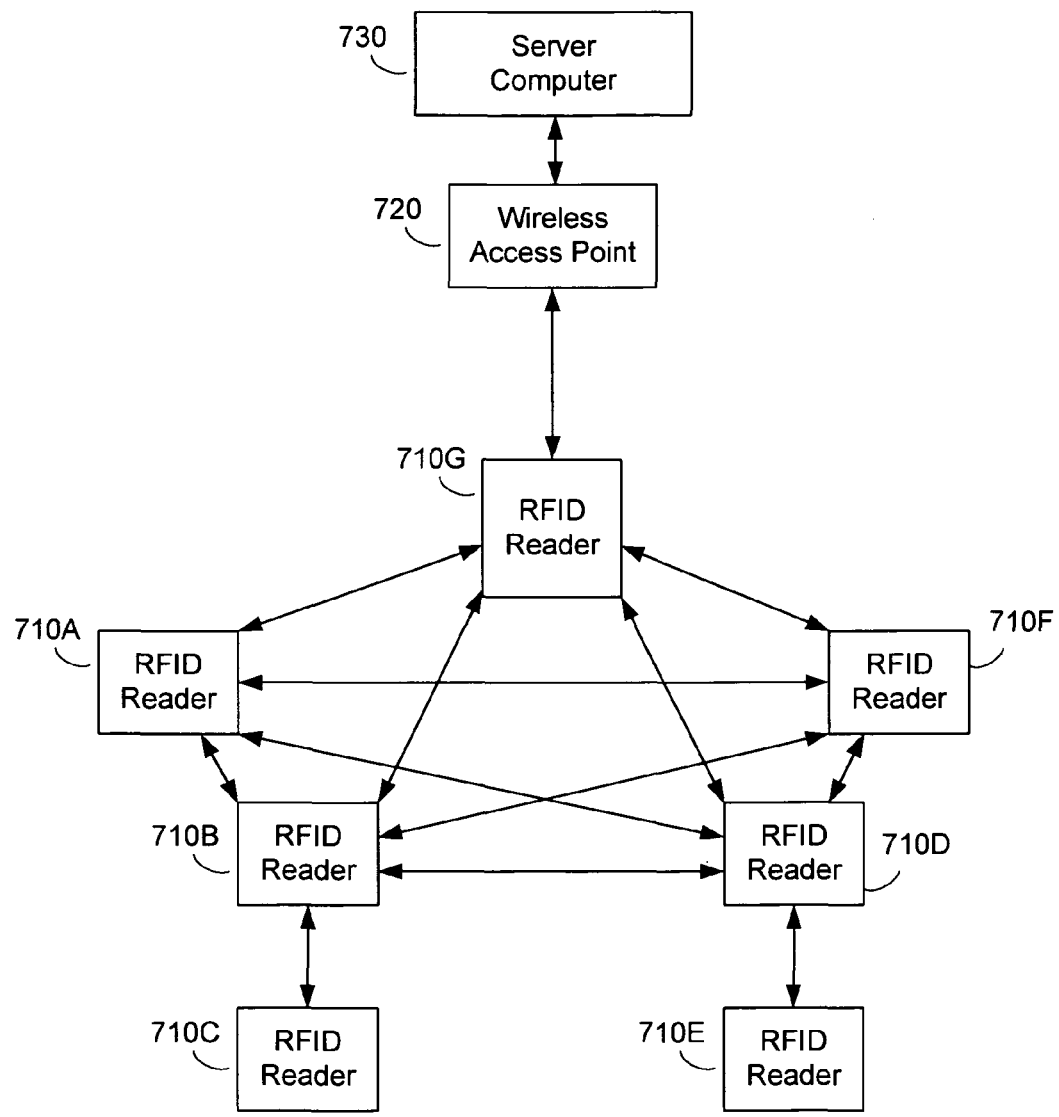
FIG. 7 illustrates a network configuration according to another embodiment of the present invention.

FIG. 5 illustrates a network configuration according to one embodiment of the present invention. Embodiments of the present invention may be implemented using a variety of network configurations. In FIG. 5, RFID readers 510A-E communicate directly with wireless access points 520A-B over a wireless network. In some cases, a reader may be within range of a plurality of access points, such as reader 510C, and may communicate directly with multiple access points. The wireless access points 520A-B, in turn, communicate with a server computer 530 over a wired or wireless connection. FIG. 6 illustrates a network configuration according to another embodiment of the present invention. In this example, a plurality of readers 610A-F may communicate wirelessly with the wireless access point through a local network coordinator reader 610G. Reader 610G may connect to access point 620 for providing all reader network traffic over a wireless communication channel. Wireless access point 620, in turn, communicates with server computer 630. The configuration of RFID readers in FIG. 6 is referred to as a "star" network. FIG. 7 illustrates a network configuration according to another embodiment of the present invention. In this example, all readers 710A-G include router components and can communicate directly with all other readers. One reader 710G may act as the local network coordinator for communicating with wireless access point 720. The configuration of readers 710A, 710B, 710D, 710F, and 710G is referred to as a "complete mesh" network. Various modifications on the above configurations are possible, including hybrid networks. In this example, readers 710C and 710E communicate through readers 710B and 710D, respectively, which results in a hybrid network.

Figure 8:
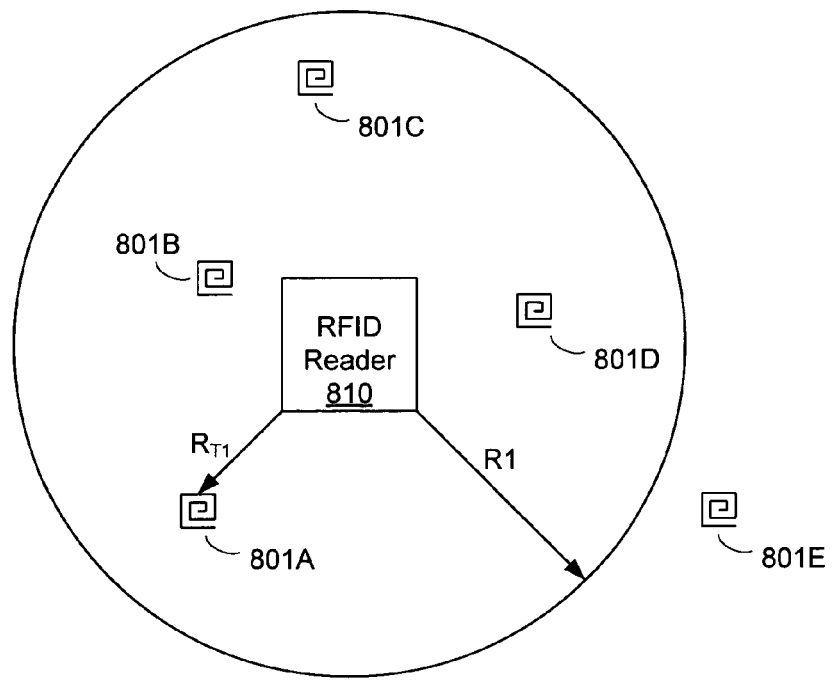
FIG. 8 illustrates the position of tags within the coverage area of a reader according to another embodiment of the present invention.

FIG. 8 illustrates the position of tags within the coverage area of a reader according to another embodiment of the present invention. The range of an RFID reader 810 is illustrated in FIG. 8. Different RFID readers may have different ranges depending on the particular technologies selected to implement the system. The maximum range at which a reader can send out a signal and receive a response from an RFID tag is depicted by R1. Tags 801A-D within this range will receive a signal from the reader and provide a response signal to the reader. The distance between reader 810 and tag 801E is greater than R1. Therefore, tag 801E may not receive a sufficiently large signal to provide a response, or the response signal may be too small to be detected by reader 801E. In either case, tag 801E is outside the coverage area of reader 810 and will not be detected.

Figure 9:
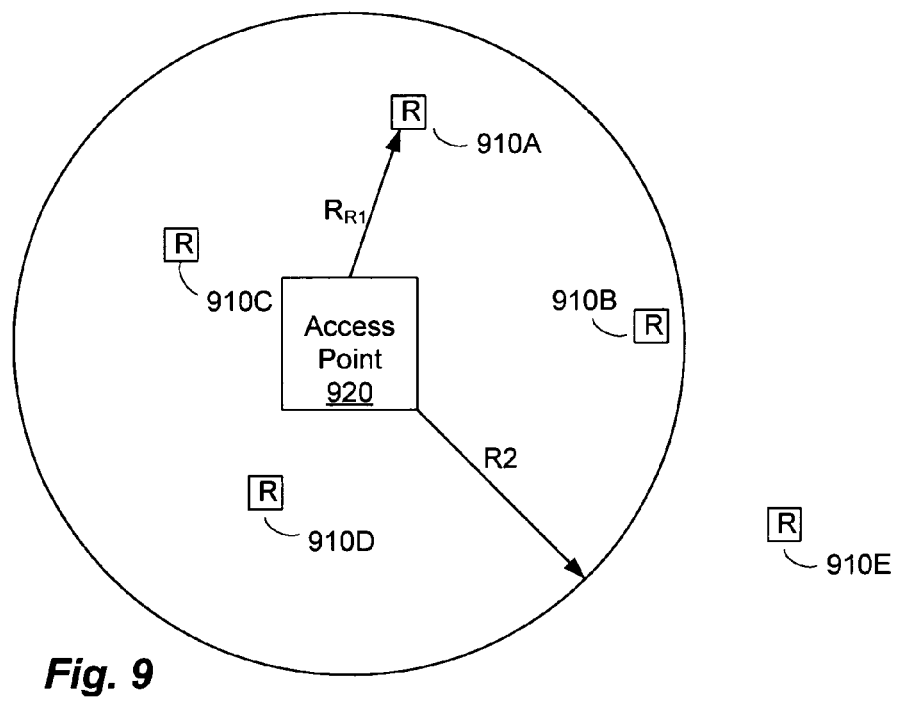
FIG. 9 illustrates the position of readers within the coverage area of an access point according to another embodiment of the present invention.

FIG. 9 illustrates the position of readers within the coverage area of an access point according to another embodiment of the present invention. The range of an access point 920 is illustrated in FIG. 9. Different access point-reader combinations may have different ranges depending on the particular wireless communication technologies selected to implement the system. The maximum range at which an access point can establish a wireless communication with an RFID reader is depicted by R2. Readers 910A-D are within range, and accordingly may establish a communication link to the access point 920. The distance between access point 920 and reader 910E is greater than R2. Therefore, reader 910E may not communicate with access point 902. Accordingly, reader 910E is outside the coverage area of access point 920.

Figure 10:
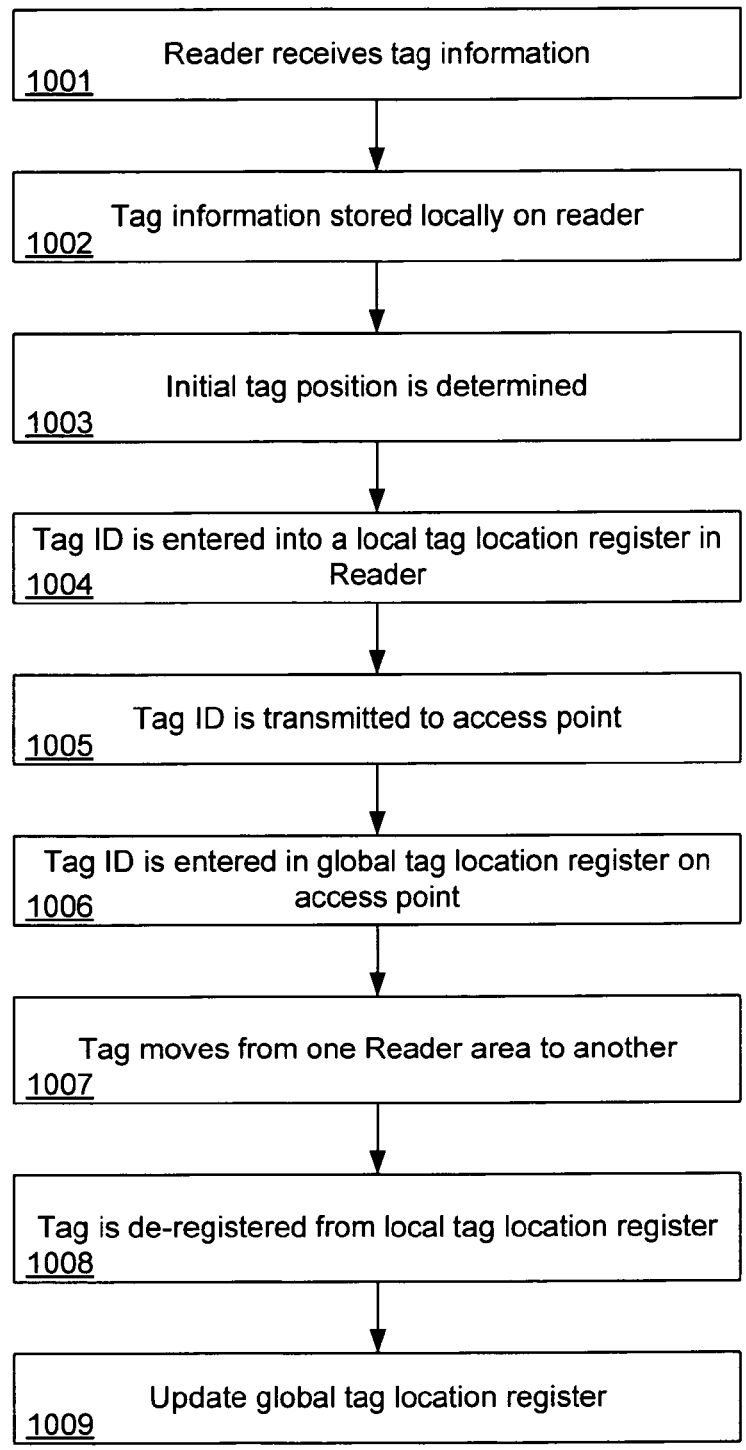
FIG. 10 illustrates tag positioning according to another embodiment of the present invention.

FIG. 10 illustrates tag positioning according to another embodiment of the present invention. When a tag is within a reader's coverage area, information stored on the tag and transmitted to the reader in response to a read request may be processed by software on the reader, the access point, or both. To initiate the process, a reader sends out a read request signal and the tag responds by transmitting tag information. At 1001, the reader receives the tag information (e.g., tag IDs). At 1002, the tag information is stored locally on the reader. In one embodiment, the reader may include a local database for storing tag information, for example.

Features of the present invention include determining the position of tags. Accordingly, at 1003 an initial position of the tag is determined. For example, in one embodiment the tag position may be determined to within the range of the reader based on the position of the reader (e.g., if the position of the reader is known). In particular, some readers may reside in known fixed locations. The location may be programmed into the reader, for example, and used to identify the position of the tag (e.g., if a reader with a range of 25 ft is located in the North corner of a warehouse at a certain address, then any tag detected by the reader is within 25 ft of that location). In other embodiments described in more detail below, tag positions may be determined more accurately from the power of the tag signal received in the reader, the angle of reception, the time of arrival, the time difference of arrival (e.g., between multiple readers as discussed below), a carrier phase measurement, triangulation with other readers, or through a global positioning system ("GPS"). In one embodiment, differential measurement techniques may be used to more accurately determine tag positions. For example, If one tag is within range of two readers, the power, angle, time of arrival and carrier phase may be measured by both readers, and middleware in the access point may be used to more accurately calculate the tag position relative to each reader. Similarly, if two tags are read by one reader, differential calculations may be applied. In one embodiment, multiple tags read by at least two readers may be read, and the middleware may calculate measured differences between tags in each reader and again between different readers to obtain a double difference calculation of the parameter of interest, thereby improving the position calculation even more.

At 1004, received tag IDs are entered into a local tag location register in the reader. In one embodiment, the tag IDs are transmitted to the access point at 1005. The tag IDs may be entered into a global tag location register on the access point, for example, at 1006. In some embodiments, an RFID system may include readers with overlapping coverage areas. Accordingly, a tag may respond to multiple readers. If a tag responds to multiple readers, the tag ID may be entered into a local tag location register on a plurality of readers. Additionally, if each reader is communicating wirelessly with the same access point, the tag ID and an identification of each reader (i.e., a reader ID) will be sent to the access point. The access point may store the tag ID multiple times—once for each reader—together with each reader's ID.

In some applications, the tag is attached to an object that may move from one location to another. Alternatively, the tags may be in fixed locations and the readers move from one location to another. Accordingly, at 1007, tags may move from one reader's coverage area to another reader's coverage area. At 1008, tags that leave a coverage area are de-registered from the local tag location register. At 1009, the global tag location register is updated. Accordingly, tags that have left the coverage area are de-registered and tags that enter the coverage area are registered. In one embodiment, tag registration may be updated with each read cycle initiated by a reader, for example.

Figure 11A:
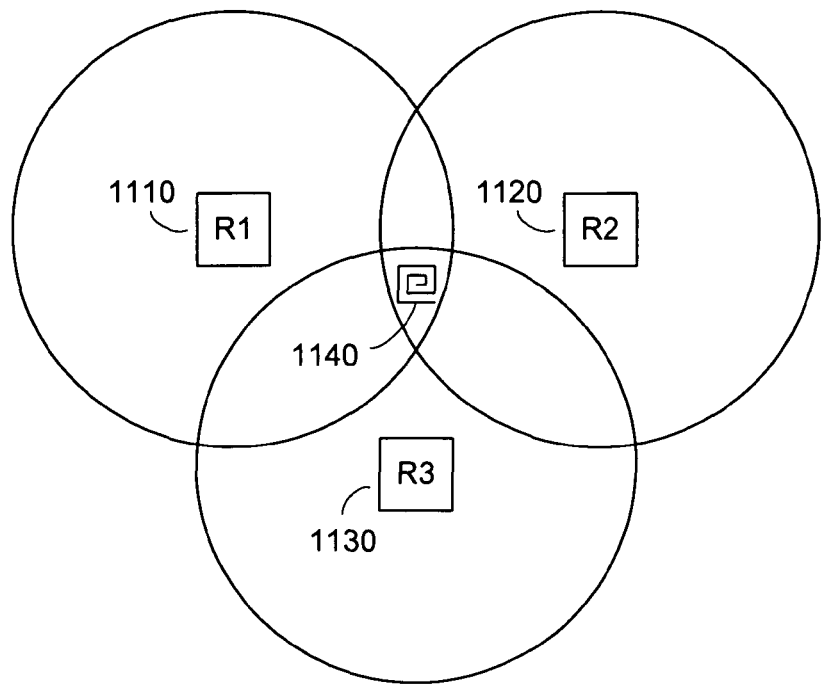
FIG. 11A illustrates determining tag position according to another embodiment of the present invention.
Figure 11B:
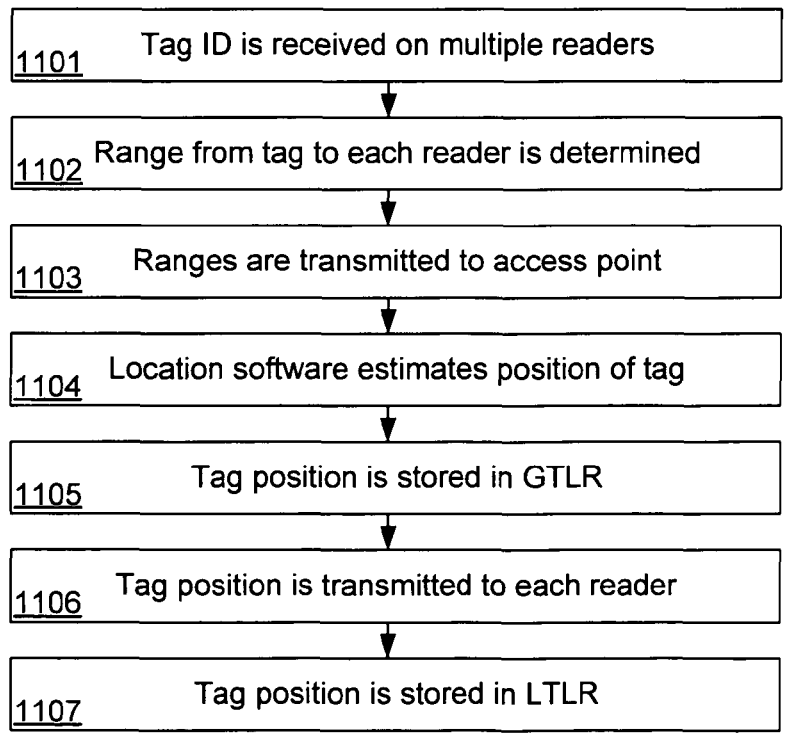
FIG. 11B illustrates a method of determining tag position according to another embodiment of the present invention.

FIG. 11A illustrates determining tag position according to another embodiment of the present invention. As mentioned above, a tag may be detected by more than one reader. For example, as shown in FIG. 11A, a tag 1140 is within the coverage area of three (3) readers 1110, 1120, and 1130. A method of determining tag position according to another embodiment of the present invention is shown in FIG. 11B. At 1101, the tag ID is received on multiple readers. If each reader's position is known, then the position of the tag may be estimated based on the reader positions. For example, if the positions of reader 1110 and 1120 are known, then the distances between these positions may be calculated. Additionally, if the range of each reader is known, then the region of overlapping coverage may also be determined. If a tag is detected by multiple readers, the position of the tag can be estimated to within the region of overlapping coverage. In other embodiments, the range of the tag from each reader may be estimated by the power of the tag signal received in the reader, the angle of reception, the time of arrival, the time difference of arrival, and carrier phase as mentioned above. At 1102, the ranges from the tag to each reader are determined. At 1103, the ranges are transmitted to an access point. At 1104, location software may be used to estimate the position of the tag from data received from each reader. This may include calculating overlapping regions, determining ranges, or performing triangulation based on three tag-to-reader ranges to improve the accuracy of the tag position. In one embodiment, optimization techniques, such as least squares estimates may be used to further improve the tag position accuracy.

At 1105, the tag position is stored in a global tag location register ("GTLR") on the access point. At 1106, the tag position may be transmitted back to each reader over the wireless channel. At 1107, the tag position may be stored in local tag location registers ("LTLR") for each reader. Tag position updates may be performed under the control of each reader or under the control of the access point. Tag position updates may occur periodically at predetermined intervals, after each read cycle, or in response to user commands or other events (e.g., automatically when a reader comes within the coverage area of a new access point). For example, in one embodiment, when an access point detects that a new reader has entered its coverage area, the access point may send commands to the new reader or all readers in the area to scan for tags in each reader's coverage area specifically for a position update. After new tag information is received by each reader, tag positions may be determined and the information may be updated on the access point or readers or both (e.g., in the GTLR or LTLR).

Figure 12:
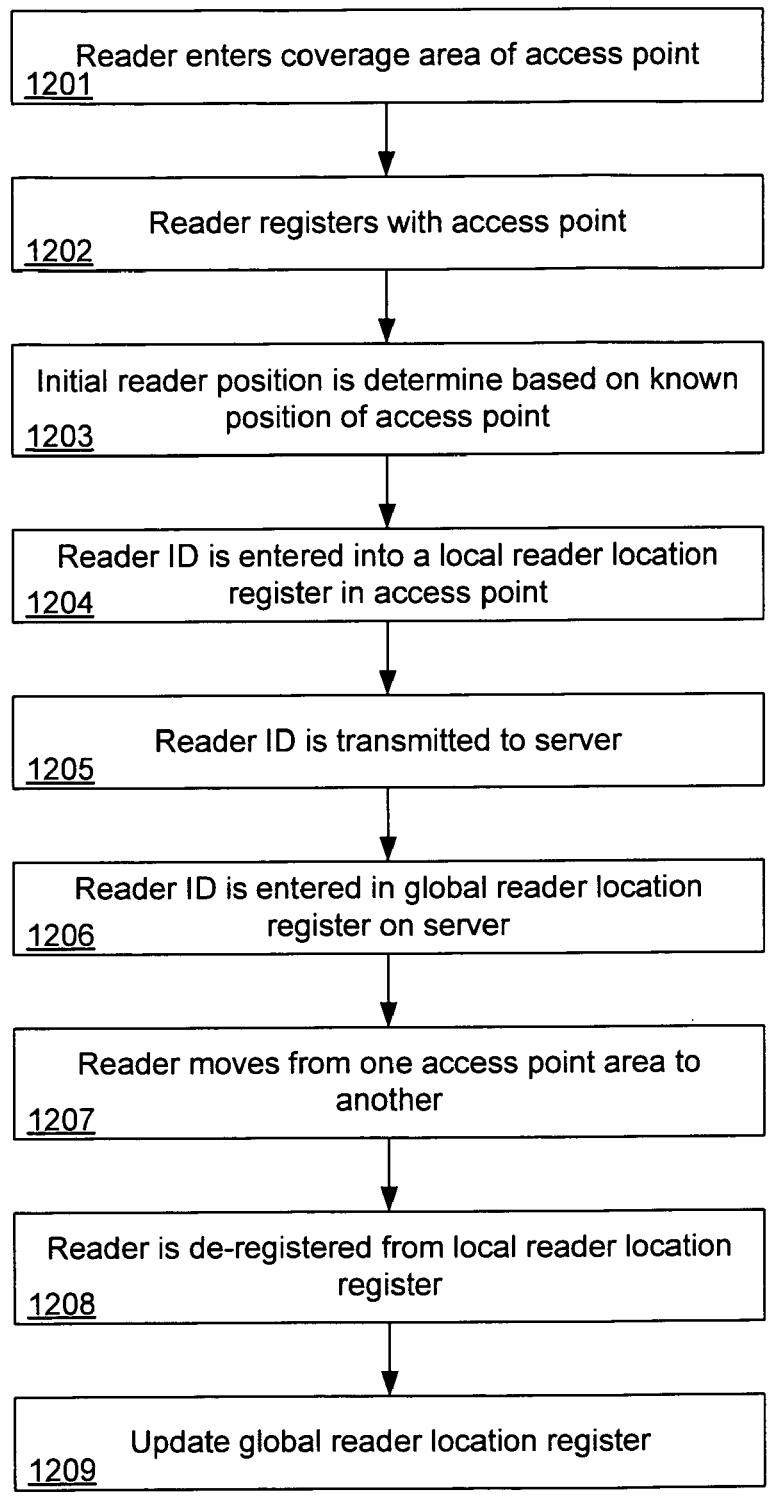
FIG. 12 illustrates reader positioning according to another embodiment of the present invention.

FIG. 12 illustrates reader positioning according to another embodiment of the present invention. In some embodiments, readers may be moved from one location to another, or the readers may be integrated on mobile devices such as personal digital assistants ("PDA"), cell phones, or any other handheld electronic device. If the readers are movable, then a reader may move between coverage areas of different access points. Embodiments of the present invention may track reader positions dynamically to improve RFID system performance. At 1201, a reader may enter the coverage area of an access point. At 1202, the reader registers with the access point. At 1203, the initial reader position is determined based on the known position of the access point. At 1204, the reader ID is entered into a local reader location register ("LRLR") in the access point. At 1205, the reader ID is transmitted to a server computer system, which may be coupled to multiple access points, for example. Embodiments of the present invention include coupling a remote server to the access point over a computer network, such as the Internet or an intranet. At 1206, the reader ID is entered into a global reader location register ("GRLR") on the server. At 1207, the reader may move from one access point coverage area to another. At 1208, the reader is de-registered from the LRLR on the access point. At 1209, the GRLR on the server is updated to reflect that the reader is no longer in the access point's area.

Figure 13A:
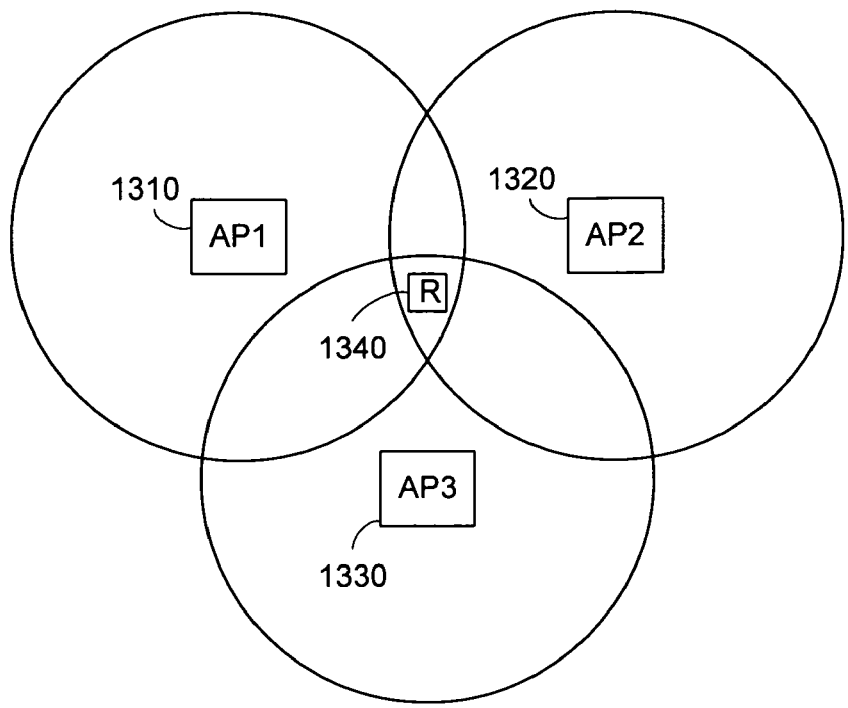
FIG. 13A illustrates determining reader position according to another embodiment of the present invention.
Figure 13B:
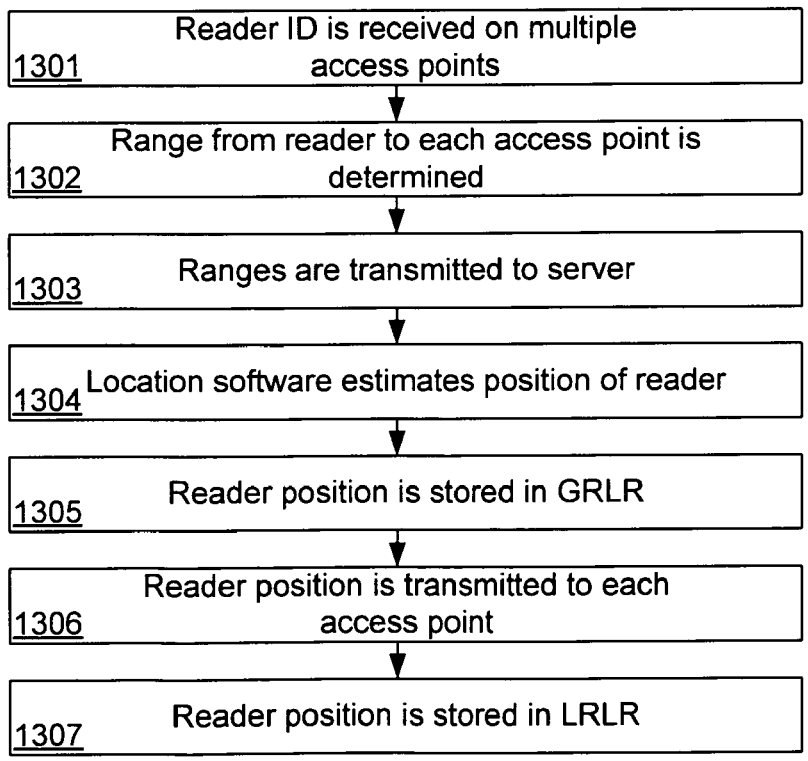
FIG. 13B illustrates a method of determining reader position according to another embodiment of the present invention.

FIG. 13A illustrates determining reader position according to another embodiment of the present invention. As mentioned above, a reader may be detected by more than one access point. For example, as shown in FIG. 13A, a reader 1340 is within the coverage area of three (3) access points 1310, 1320, and 1330. A method of determining reader position according to one embodiment of the present invention is shown in FIG. 13B. At 1301, the reader ID is received on multiple access points. If each access point's position is known, then the position of the reader may be estimated based on the access point positions. For example, if the positions of access points 1310 and 1320 are known, then the distances between these positions may be calculated. Additionally, if the range of each access point is known, then the region of overlapping coverage may also be determined. If a reader is detected by multiple access points, the position of the reader can be estimated to within the region of overlapping coverage. In other embodiments, the range of the reader from each access point may be estimated. At 1302, the ranges from the reader to each access point are determined. At 1303, the ranges are transmitted to a server. At 1304, location software may be used to estimate the position of the reader from data received from each access point. This may include calculating overlapping regions, determining ranges, or performing triangulation based on three different reader-to-access point ranges to improve the accuracy of the reader position. In one embodiment, optimization techniques, such as least squares error minimization of the distance estimates, may be used to further improve the triangulation results and the reader position accuracy.

At 1305, the reader position is stored in a global reader location register ("GRLR") on the server. At 1306, the reader position may be transmitted back to each access point over the wired or wireless network. At 1307, the reader position may be stored in local reader location registers ("LRLR") for each access point. Reader position updates may be performed under the control of each access point or under the control of the server. Reader position updates may occur periodically at predetermined intervals, after each read cycle, or in response to user commands or other events (e.g., automatically when a reader enters or leaves the coverage area of an access point). For example, in one embodiment, when an access point detects that a new reader has entered its coverage area, it may send a signal to the server to trigger all access points to perform a scan for readers in each area specifically for a position update. After new reader information is received by each access point, reader positions may be determined and the information may be updated on the server or access points or both (e.g., in the GRLR or LRLR).

Figure 14:
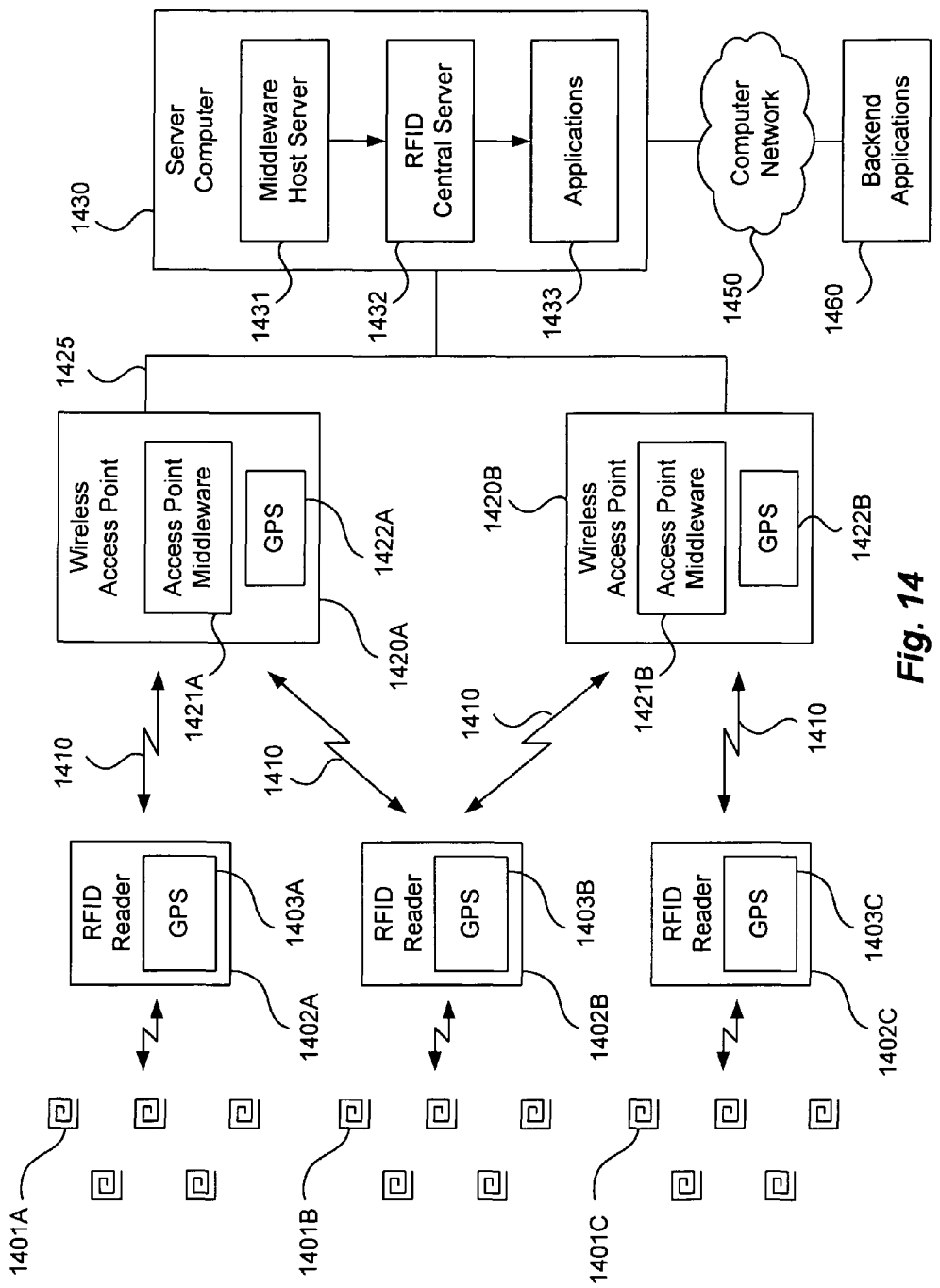
FIG. 14 illustrates an RFID network with integrated GPS according to another embodiment of the present invention.

FIG. 14 illustrates an RFID network with integrated GPS according to another embodiment of the present invention. In some embodiments, the tags 1401, readers 1402, or access points 1420 may include limited or full GPS functionality, and the wireless RFID reader network may be used to improve positioning of readers and tags using the GPS system or assisted GPS system at the reader level (i.e., between the access point and reader) or at the tag level (i.e., between the reader and the tag). For example, access points 1420 may have full GPS systems 1422 integrated into the access point, readers may have no GPS, partial GPS or full GPS integrated into the reader, and tags may have no GPS, partial GPS or full GPS integrated into the tag. In one embodiment, a full GPS receiver is included in one or more access points 1420A-B and the GPS receiver included in each reader 1402A-C may support any combination of three modes, namely, autonomous mode, reader-based mode, and reader-assisted mode. Access point GPS 1422 tracks signals from satellites to determine the position of the access point. In the autonomous mode, the reader also includes a full GPS receiver, which is used to track all or a number of the visible satellite signals and calculate the reader position and possibly velocity internally in the reader. In reader-based mode or reader-assisted modes, the position and satellite information from the access point are used to improve the speed and accuracy in determining the reader locations. The reader may receive information as to which satellites to track. The readers may be provided with a smaller range of code and frequency offsets to search, thereby reducing the GPS acquisition time for the reader and enabling the GPS acquisition for the reader in regions with lower received GPS signal SNR. The readers may also receive GPS navigation data to enable the GPS receiver 1403A-C embedded in readers 1402A-C to increase the coherent correlation interval as described below, and thereby track weaker GPS signals (i.e., improving sensitivity). In the reader-based mode, the reader obtains the assisting data from the access point and tracks all or a number of visible satellite signals to obtain the GPS raw measurements (any combination of pseudoranges, pseudodopplers, and accumulated carrier phase) and to calculate the reader position and possibly velocity internally in the reader. In reader-assisted mode, on the other hand, the final reader position and/or velocity are calculated inside the access point and not in the reader. Specifically, the reader uses the assisting data from the access point to improve its signal acquisition and tracking performance and to obtain the GPS raw measurements or just the GPS signal correlations. The GPS raw measurements or GPS correlation outputs are then transmitted back to the access point where the reader position and/or velocity are calculated which may then be communicated back to the reader.

For example, in one embodiment, the GPS in the access point may use a tracking loop and a correlation scheme to track the signals from different satellites. However, the process of tracking and correlating data in a GPS can be computationally intensive. In one embodiment, the access point transmits the tracking information to the reader over the wireless communication channel so that the reader can track satellites faster and with reduced processing. For example, the access point may correlate data signals from satellites with a locally generated pseudo-random ("PN") code (e.g., a high speed pulse train) in order to track each satellite. If the GPS signal comprises 50 Hz data modulated into a 1 MHz spread spectrum code, then the correlation length cannot be more than 20 ms (1/50 Hz) or the data will change and the correlation may become destructive. However, since the access point is decoding and correlating the GPS data, the access point may pass on this information to the reader over the wireless network so that the reader will not be required to decode the data from the satellite. This allows the reader to correlate over longer time periods (i.e., greater than 20 ms), thereby improving the processing gain, allowing averaging to occur over a longer period of time, and thereby allowing the reader to track weaker signals. After the reader receives the GPS information from the access point, it performs the correlation as described above to obtain the GPS raw measurements. The reader then may use the GPS raw measurements to obtain the reader position and/or velocity internally (reader-based) or may communicate the GPS raw measurements to the access point where the reader position and/or velocity are calculated (reader-assisted).

Figure 15:
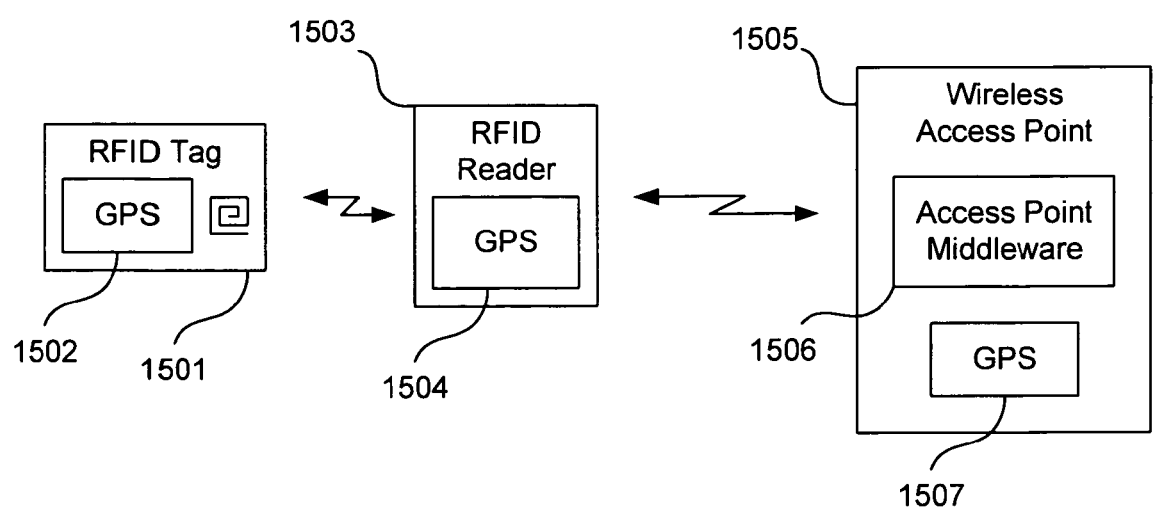
FIG. 15 illustrates an RFID network with integrated GPS according to another embodiment of the present invention.

In another embodiment, GPS information transmitted to readers 1402A-C may be further transmitted to tags 1401. FIG. 15 illustrates another embodiment of the present invention. In this example, each tag 1501 includes limited GPS functionality (e.g., a correlation engine). Access point GPS 1507 tracks signals from satellites to determine the position of the access point. The position and satellite information from the access point may be used to improve the speed and accuracy in determining both the reader locations and the tag location. Similar to reader-access point GPS related interactions, the embedded GPS functionality in the tags may support autonomous, tag- based, and tag-assisted modes. In autonomous mode, a full GPS receiver functionality should be embedded in the tags. For tag-based mode, the tags still have a full GPS receiver embedded in them, except that they can also get the assisting data from the reader to improve their GPS signal acquisition and tracking. In tag-assisted mode, the tags only have a limited functionality GPS receiver such as a correlation engine embedded in them to only obtain the GPS raw measurements or possibly just the correlation results and communicate them back with the reader where the tag position and/or velocity are calculated. The tag may receive information from the reader as to which satellites to track. The tags may be provided with a smaller range of code and frequency offsets to search, thereby reducing the GPS acquisition time for the tag and enabling the GPS acquisition for the tag in regions with lower received GPS signal SNR. The tags may also receive GPS navigation data to enable the GPS receiver 1502 embedded in tag 1501 to increase the coherent correlation interval as described above, and thereby track weaker GPS signals (i.e., improving sensitivity). In some embodiments, each reader 1503 may have a full GPS system to interact directly with the tag's limited GPS system 1502.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A method for managing a set of tag readers by an access point, the access point having a coverage area for monitoring the set of tag readers, each tag reader having a coverage area for monitoring a set of tags, the method comprising:

determining groups of tag readers, wherein each tag reader within a group has a coverage area that overlaps coverage areas of other tag readers in the group and tag readers from different groups do not have coverage areas that overlap each other, wherein said determination is based on (i) a range of the coverage area of each tag reader and (ii) a distance between each particular tag reader and a closest tag reader to the particular tag reader;

for each particular group, configuring all tag readers within the particular group to sequentially transmit read requests to the set of tags in the coverage area of each tag reader in order to prevent simultaneous read requests being sent to a particular tag that is positioned in overlapping coverage areas of at least two tag readers; and configuring a plurality of tag readers that do not belong to a same group to transmit read requests in parallel.

2. The method of claim 1 further comprising determining the distance between each particular tag reader and the closest tag reader to the particular tag reader based on a known fixed location of at least one reader.

3. The method of claim 1 further comprising determining the distance between each particular tag reader and the closest tag reader to the particular tag reader by determining a location of one or more tag readers that reside in overlapping coverage areas of the access point and at least one other access point.

4. The method of claim 1 further comprising determining the distance between each particular tag reader and the closest tag reader to the particular tag reader using a Global Positions System (GPS) module in at least one tag reader.

5. The method of claim 1, wherein the set of tags are Radio Frequency Identification (RFID) tags and the set of tag readers are RFID readers, the RFID tags comprising backscattering circuits for communicating with the RFID readers.

6. The method of claim 1, wherein the set of tag readers and the set of tags are communicatively coupled through a wireless sensor network.

7. The method of claim 1, wherein each tag reader is one of an application specific reader, a personal digital assistant, and a cell phone.

8. The method of claim 1, wherein the set of tags is configured as a sensor network, wherein tags in the set of tags provide automatic identification to the set of tag readers through a wireless link.

9. An access point for managing a set of tag readers, the access point having a coverage area for monitoring the set of tag readers, each tag reader having a coverage area for monitoring a set of tags, the access point comprising:

an interface for communicating with the set of tag readers; and a module (i) to determine groups of tag readers, wherein each tag reader in a group has a coverage area that overlaps coverage areas of other tag readers in the group and tag readers from different groups do not have coverage areas that overlap each other, wherein said determination is based on a range of the coverage area of each tag reader and a distance between each particular tag reader and a closest tag reader to the particular tag reader, (ii) to configure all tag readers within each particular group to sequentially transmit read requests to the set of tags in the coverage area of each tag reader in order to prevent simultaneous read requests being sent to a particular tag that is positioned in overlapping coverage areas of at least two tag readers, and (iii) to configure a plurality of tag readers that do not belong to a same group to transmit read requests in parallel.

10. The access point of claim 9, wherein the module further determines the distance between each particular tag reader and the closest tag reader to the particular tag reader by determining a location of one or more tag readers that reside in overlapping coverage areas of the access point and at least one other access point.

11. A system for managing a set of tag readers, the system comprising:

a set of tags, each tag in the set communicatively coupled to at least one tag reader;

the set of tag readers communicatively coupled to an access point, wherein the set of tag readers receive read requests from the access point and transmit the read requests to the set of tags; and the access point having a coverage area for monitoring the set of tag readers, wherein the access point determines groups of tag readers, each tag reader in a group having a coverage area that overlaps coverage areas of other tag readers in the group and tag readers from different groups do not have coverage areas that overlap each other, said determination based on (i) a range of the coverage area of each tag reader and (ii) a distance between each particular tag reader and a closest tag reader to the particular tag reader, wherein the access point configures all tag readers within each particular group to sequentially transmit read requests to the set of tags in the coverage area of each tag reader in order to prevent simultaneous read requests being sent to a particular tag that is positioned in overlapping coverage areas of at least two tag readers, and wherein the access point configures a plurality of tag readers that do not belong to a same group to transmit read requests in parallel.

12. The system of claim 11, wherein the access point communicates with the set of tag readers via a wireless communication channel.

13. The system of claim 11, wherein each of the set of tag readers comprises a Global Positions System (GPS) module, wherein the access point further determines the distance between each particular tag reader and the closest tag reader to the particular tag reader by using information transmitted from the GPS modules in the tag readers.

* * * * *